May 21, 1929.  A. M. CLARK  1,714,077
BATTERY TERMINAL
Filed Feb. 20, 1926
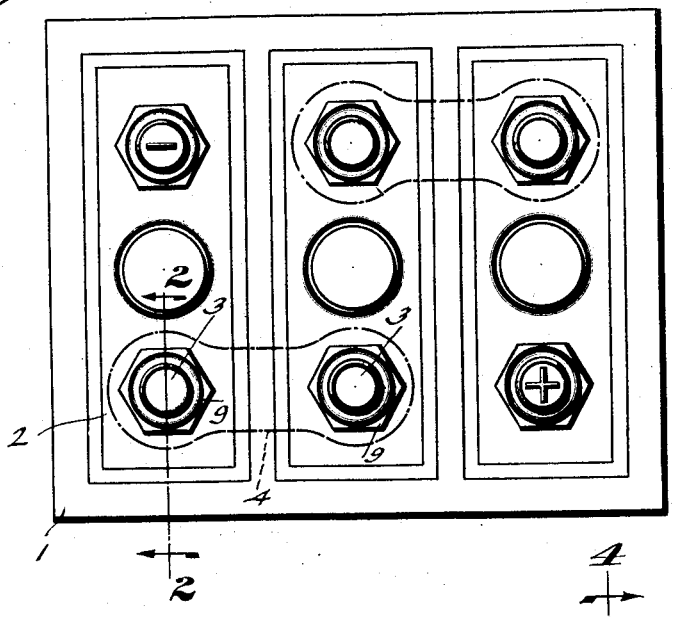
Fig.1
Fig.3
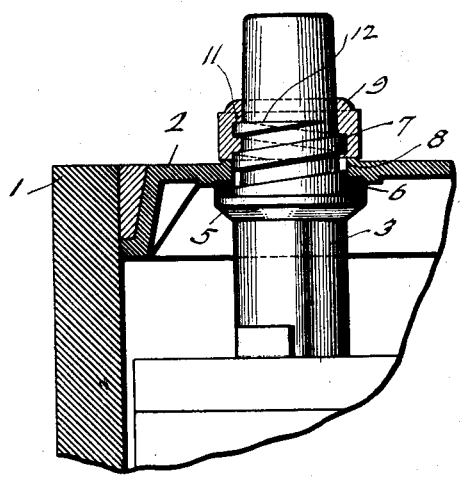
Fig.2
Fig.4
Inventor
Adrian M. Clark
By Wood & Wood
Attorneys Patented May 21, 1929.

1,714,077

UNITED STATES PATENT OFFICE.

ADRIAN M. CLARK, OF CINCINNATI, OHIO, ASSIGNOR TO THE COOPER CORPORATION, OF CINCINNATI, OHIO, A CORPORATION OF DELAWARE.

BATTERY TERMINAL.

Application filed February 20, 1926. Serial No. 89,583.

This invention relates to improvements in battery connections, an object being to prevent acid or electrolyte from reaching the outwardly projecting terminals or posts, and terminal connections, of the battery, and thus prevent corrosion.

Various devices have been used without success, to sealingly clampingly attach the electrode or post to the cover, the most common device being to thread the upwardly projecting end of the post or electrode, and to use a nut as a sealing device in threaded connection with the post, the nut being clamped against the top of the cover. This device is unsatisfactory inasmuch as acid invariably finds its way through the nut around the threads of nut and post, and outwardly to the top of the nut, and thence to the cell connector.

An object of this invention is to provide means for positively sealingly and clampingly connecting the nut to the post, and against the cover, whereby the electrolyte cannot reach the upper side of cover or nut.

Applicant has solved the problem of sealing, in a novel manner, by using a soft metal nut having threads extending only partially therethrough in a direction from its lower or clamping face towards, but not through the top, the threads ending at a point above the upper or non-clamping face of the nut, thus providing an overhanging thread-shoulder or thread-abutment, with which corresponding end portions of the threads of the post are inter-jammingly and sealingly engaged, when the soft metal nut is forced to clamping position. Inasmuch as the threads of nut are formed in soft metal, the opposing end threads have a force or jam fit, when the nut is screwed to position.

Other objects and certain advantages will be more fully set forth in the description of the accompanying drawings forming a part of this specification, in which:

Figure 1 is a top plan view illustrating a battery constructed in accordance with the teachings of this invention.

Figure 2 is a vertical section through one of the battery posts showing the improved sealing connection between post and cover.

Figure 3 is a plan view of the nut.

Figure 4 is a section through the nut on line 4—4, Figure 3, showing a portion of the thread shoulder.

The invention may be applied for sealingly connecting the battery post or electrode of any battery, with the cover. The battery box is represented at 1, the cover at 2, and the battery post at 3. The battery post 3 has a radial circular flange 5 formed adjacent its upper end, the said flange adapted to underlie the lid. Between this flange and the bottom of the lid is interposed a sealing gasket 6, which surrounds the lower portion of threads 7, provided upon the upwardly convergent conical terminal of the post, over the upper portion of which is engaged by the cell connector or strap, positionally shown in dot and dash lines at 4. The threads 7 extend from the radial flange upwardly through an opening 8 in the lid, and to a distance above the top of the lid, generally slightly less than the length of the threaded portion of the bore of the nut 9, which is clampingly and sealingly engaged as shown in Figure 2.

The nut 9 formed from soft metal, is threaded as at 10 the threads extending partially therethrough from the lower or clamping side, towards the upper or non-clamped side, to form a thread-shoulder or jamming stop, which is adapted to engage an upper thread-shoulder 12, of the post threads.

In making the nut, the same is suitably bored, and then partially threaded with the threads extending from the clamping face or side toward but not through the non-clamping end, leaving or providing the interior annular thread-shoulder as an abutment or inclined jamming annulus. When the nut is forced to clamping position, the shoulder is sealingly jammed and engages or abuts the corresponding terminal shoulder form at the upper end of the battery post threads, after the lower end of the nut is at clamping position, against the top of the cover, without interfering with the clamping action of the nut with respect to the upper side of said lid or cover.

Thus when the soft metal nut is set at clamping position, the flange 5 compresses and sealingly engages the gasket with the bottom side of the cover about the opening 8, and the lower or clamping end of the nut is positively engaged with the top of the cover about the opening, with the opposing abutments forming by the threads of nut and post, frictionally jammed and sealingly engaged or pressed into or against one another, thus positively obtaining a sealing fit between post and nut, between post and lower side of the cover, and between lower surface of nut and top surface of cover.

In order that the thread shoulder of the nut may be jammingly engaged with a portion of the thread of the post at the same time that the face of the nut clampingly engages the lid about the opening, the length of the post threads above the lid is slightly greater than the distance of the shoulder from the lid engaging or clamping space of the nut. Thus when the nut is screwed home the inter-jamming engagement of the threads is accomplished virtually simultaneously with the engagement of the clamping face of the nut with the lid to positively obtain a sealing engagement between the lid and bottom face of the nut and between the threads.

It is of advantage to otherwise provide for a snug fit between all portions of nut and post threads, which is accomplished by properly proportioning the internal dimension of the nut threads, relative to the exterior dimension of the post threads, so that a comparatively slight extra amount of force is necessary to screw the nut to clamping position on the post.

Having described my invention, I claim:

In a storage battery, a terminal provided with a continuous thread, said terminal extending through the battery cover, said terminal flanged below said cover, and a soft metal sealing retaining nut provided with a continuous thread cooperable with said terminal thread for clamping said cover between said flange and said nut, said nut characterized by a screw thread extending but partially therethrough and terminating in an inclined shoulder to provide jamming engagement with the top of the terminal thread to seal the storage battery.

In witness whereof, I hereunto subscribe my name.

ADRIAN M. CLARK.